US007319580B2

(12) United States Patent
Chou

(10) Patent No.: US 7,319,580 B2

(45) Date of Patent: Jan. 15, 2008

(54) COLLAPSING ZIPPER VARACTOR WITH INTER-DIGIT ACTUATION ELECTRODES FOR TUNABLE FILTERS

(75) Inventor: Tsung-Kuan Allen Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 11/092,022

(22) Filed: Mar. 29, 2005

(65) Prior Publication Data

US 2006/0226501 A1 Oct. 12, 2006

(51) Int. Cl.
*H01G 7/00* (2006.01)

(52) U.S. Cl. ...................... 361/277; 361/272; 361/278; 361/287; 361/290; 361/292

(58) Field of Classification Search ................ 361/272, 361/277–278, 279–282, 287, 290, 292, 283.1, 361/283.3, 298.1, 298.2

See application file for complete search history.

(56) References Cited

U.S. PATENT DOCUMENTS 5,903,380 A * 5/1999 Motamedi et al. .......... 359/224
6,127,744 A * 10/2000 Streeter et al. ............. 307/125
6,229,684 B1 5/2001 Cowen et al.
6,307,452 B1 * 10/2001 Sun ............................ 333/262
6,683,513 B2 * 1/2004 Shamsaifar et al. ........ 333/135
6,909,589 B2 * 6/2005 Huff ........................... 361/281
6,949,985 B2 * 9/2005 Qiu et al. .................. 333/105
7,085,122 B2 * 8/2006 Wu et al. .................. 361/277
7,215,461 B1 * 5/2007 Leung et al. .............. 359/291

FOREIGN PATENT DOCUMENTS

EP 1 156 504 A 11/2001
WO WO 2005/104158 A 11/2005

OTHER PUBLICATIONS

PCT Search Report, PCT/US2006/011134, mailed Jul. 24, 2006.

* cited by examiner

*Primary Examiner*—Nguyen T. Ha
(74) *Attorney, Agent, or Firm*—Blakely, Sokoloff, Taylor & Zafman LLP

(57) ABSTRACT

According to one embodiment a microelectromechanical (MEMS) switch is disclosed. The MEMS switch includes a substrate, a plurality of actuation electrodes mounted on the substrate, a plurality of bottom electrodes mounted on the substrate, a capacitor having subcomponents mounted on the two or more bottom electrodes and a top bendable electrode mounted on the substrate. The top electrode collapses a first magnitude towards the actuation electrodes whenever a first voltage is applied to one or more of the actuation electrodes and collapses a second magnitude towards the actuation electrodes whenever a second voltage is applied to the actuation electrodes.

12 Claims, 12 Drawing Sheets

200 C2 210 C1 C3 C3 C2 C1 k3 k2 k1 215 230

COLLAPSING ZIPPER VARACTOR WITH INTER-DIGIT ACTUATION ELECTRODES FOR TUNABLE FILTERS

FIELD OF THE INVENTION

The present invention relates generally to micro-electromechanical systems (MEMS) and, more specifically, the present invention relates to a MEMS varactors.

BACKGROUND

Micro-electromechanical systems (MEMS) devices have a wide variety of applications and are prevalent in commercial products. One type of MEMS device is a MEMS varactor (variable capacitor). A MEMS RF varactor may be used for RF filter frequency tuning to enhance the wireless system's capability. A tunable RF filter includes one or more MEMS varactors arranged in the filter circuit. The MEMS varactor is ideal for wireless devices because of their low power characteristics and ability to operate in radio frequency ranges. MEMS RF varactors show their promising applications in cellular telephones, wireless computer networks, communication systems, and radar systems. In wireless devices, MEMS RF varactors may be used for tunable antenna, tunable filter banks, etc.

MEMS varactors may be implemented to provide solutions for achieving capacitance tuning for RF applications, such as tunable filters. Most varactors include a single gap, which limits tuning ratio. Thus, the gap is the same at both capacitor and actuation regions. Such structure has the advantage of simple fabrication. However, the top electrode can only be moved down to approximately one-third of the air gap before the "pull-in" occurs. This causes an abrupt increase of capacitance that cannot be used beyond this point for a continuous tuning application.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A zipper varactor for a MEMS switch is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
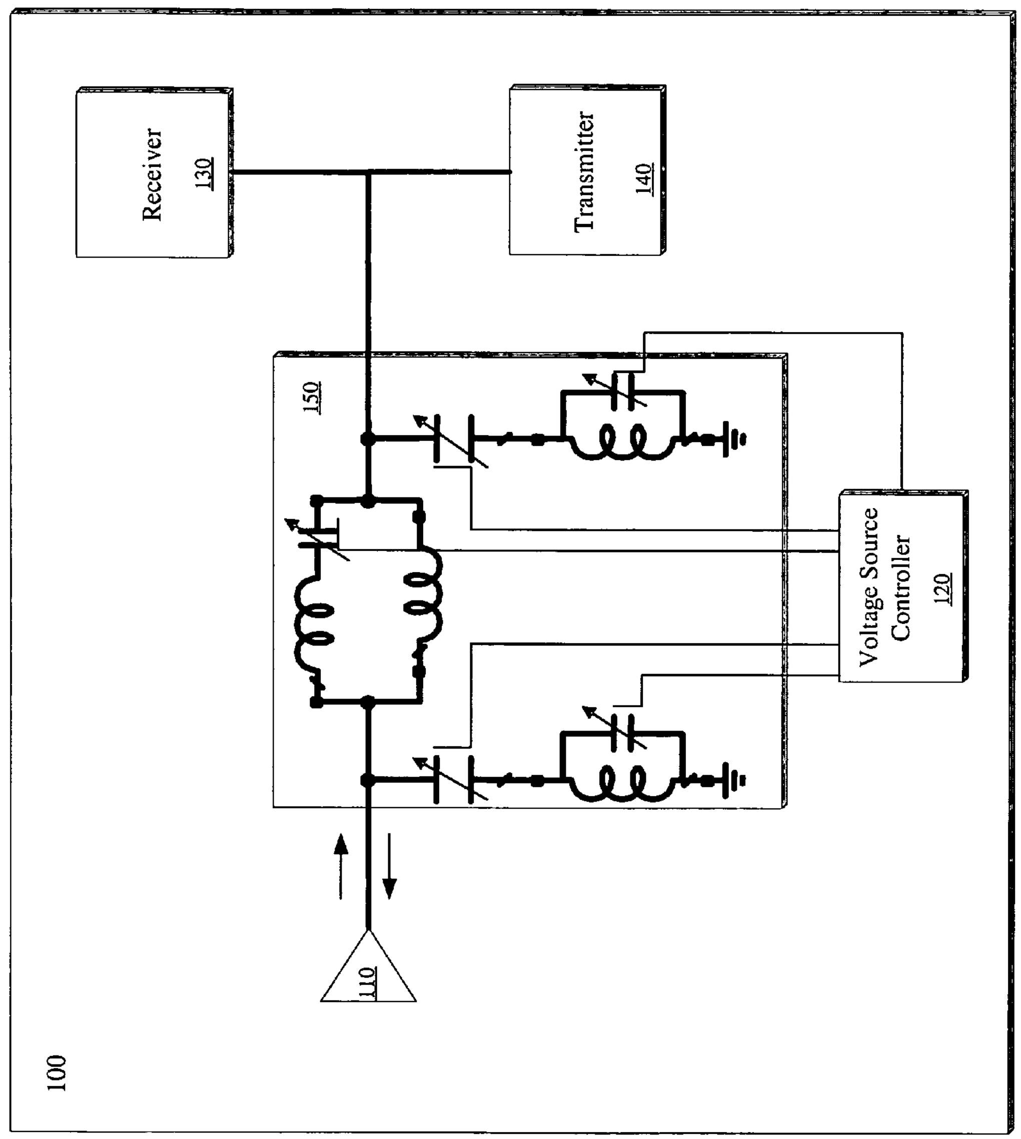
FIG. 1 illustrates one embodiment of a wireless communications system.

FIG. 1 illustrates one embodiment of a wireless system 100. System 100 includes a RF filter 150. In one embodiment, RF filter 150 is constructed of several specific inductors and capacitors, which exhibit a specific RF filtering characteristic at desired frequency range. For wireless applications, several filters with various frequency ranges are implemented to increase system 100 performance and functionality. Although shown as a tunable filter, RF filter may be implemented as other types of filters (e.g., a fixed-band filter).

According to one embodiment, MEMS varactors are included in filter 150 to implement the capacitors. In such an embodiment, the varactor capacitances are adjusted to desired values to tune filter 150 for another frequency range. Voltage source controller 120 is electrically connected to the MEMS varactors.

In one embodiment, voltage source controller 120 includes logic for selectively supplying voltages to actuation electrodes (not shown) within filter 150 to selectively activate switch 150. Receiver 130 processes signals that are received at system 100 via antenna 110. Transmitter 140 generates signals that are to be transmitted from system 100.

Figure 2A:
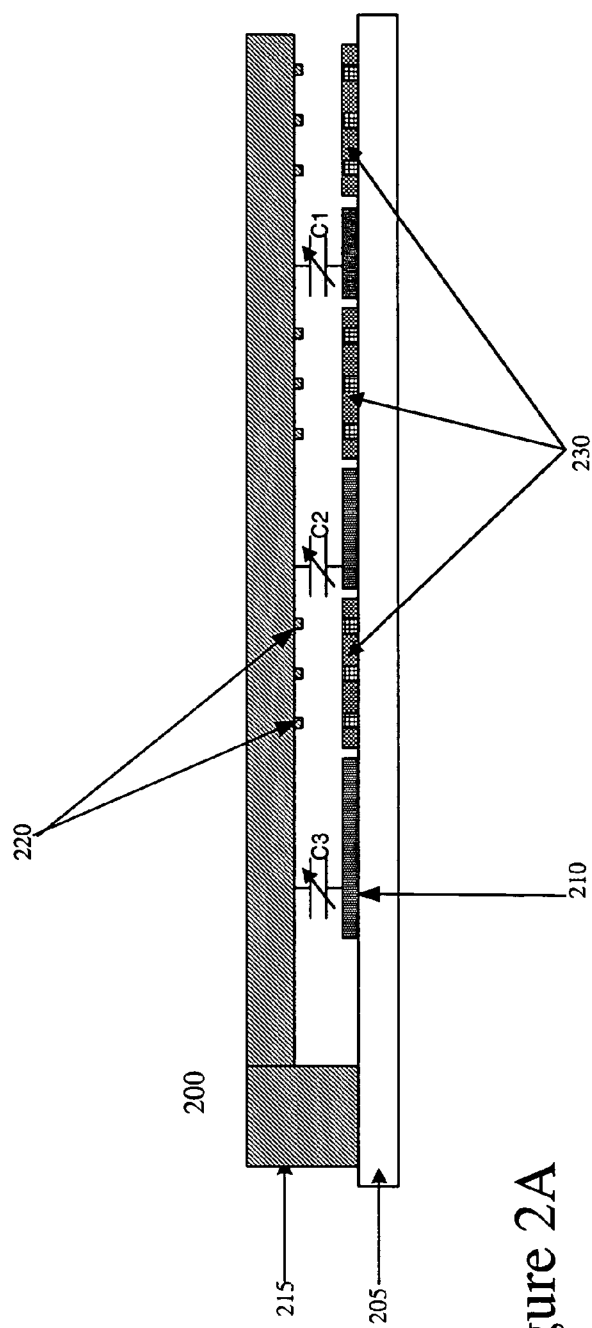
FIG. 2A illustrates a cross section view of one embodiment of a RF MEMS varactor.
Figure 2B:
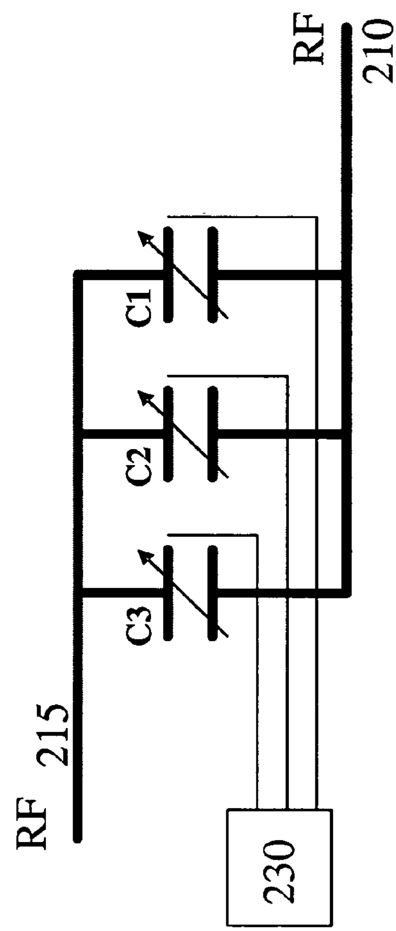
FIG. 2B illustrates a schematic of one embodiment of a RF MEMS varactor.

FIG. 2A illustrates one embodiment of a RF MEMS varactor 200, while FIG. 2B illustrates one embodiment of a schematic for varactor 200. Varactor 200 includes a substrate/dielectric 205, a bottom electrode 210 layered over the substrate 205, and a top electrode 215 mounted on substrate 205. Electrode 215 carries RF signal ("Vs") that is received or transmitted from 150. According to one embodiment, electrode 215 is a bendable/movable conductive beam that includes a thick metal (e.g., gold).

Actuation electrodes 230 are also included. Actuation electrodes 230 are mounted on substrate 205, and allow a signal to pass from electrode 215 upon becoming electrically charged (or actuated). In one embodiment, actuation electrodes 230 are inter-digit actuation electrodes that may be connected and actuated simultaneously for analog applied voltage, or may be actuated separately with individual digital applied voltages. In addition, stoppers 220 are included to maintain a predetermined gap between electrode 215 and electrodes 230 when varactor 200 is in a collapsed state.

In a further embodiment, actuation electrodes 230 are distributed with several digits under electrode 215. Each electrode 230 may have different sizes. The actuation region is constructed with physical stoppers 220 to enable collapsing zipping action during actuation. Such a method prevents DC actuation charging since no insulator is used.

The collapsing action of bendable electrode 215 depends on the voltages applied to actuation electrodes 230. As discussed above, inter-digit actuation electrodes 230 may be either connected and actuated simultaneously by analog voltage or completely separated by individual digital voltages. In various embodiments, analog actuation voltage is not available due to a system setup issue. Thus, multi-digit electrodes enables multi-stage actuation with separate fixed digital voltages.

Figure 3:
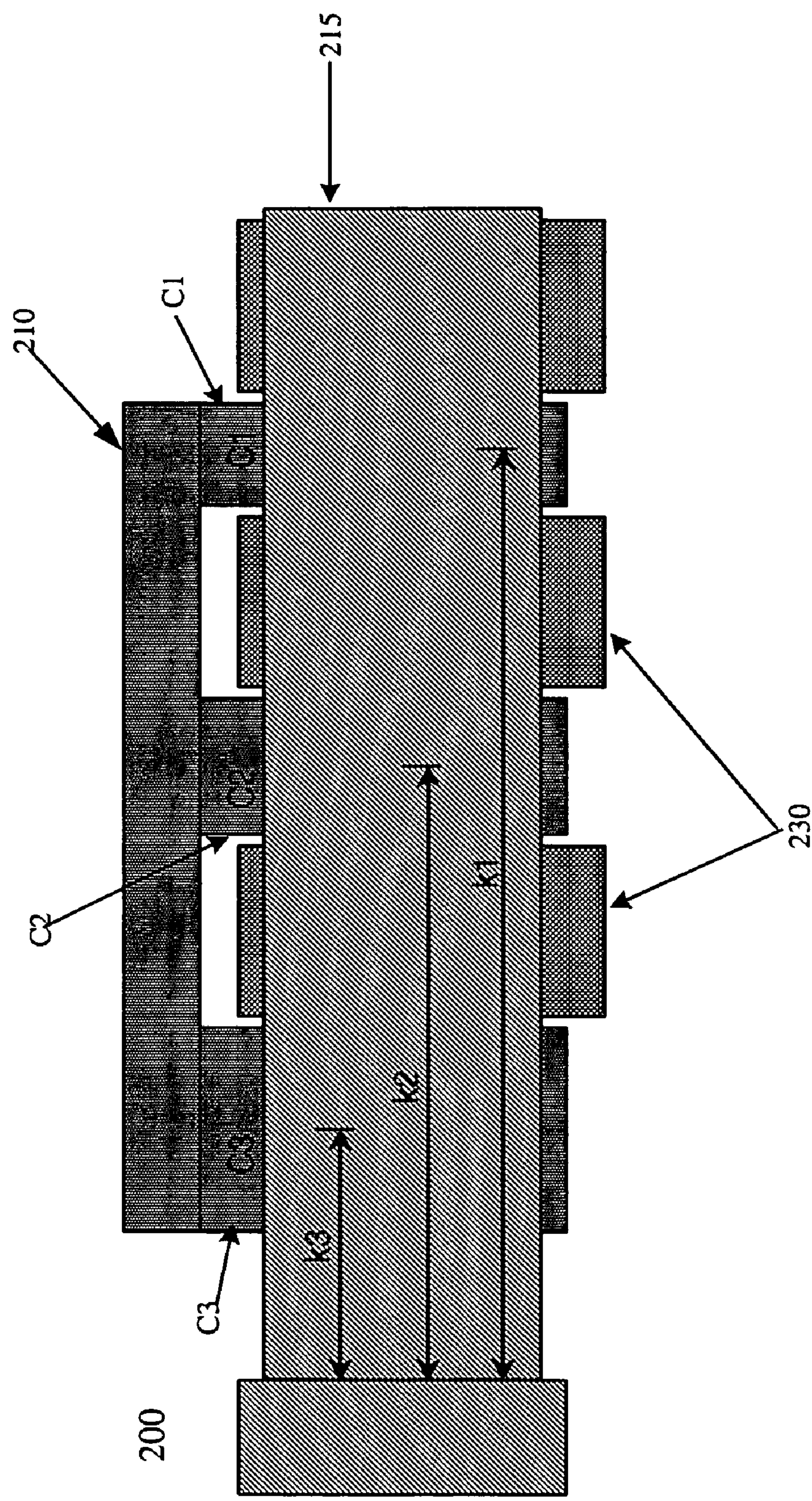
FIG. 3 illustrates a top view of one embodiment of a RF MEMS varactor.

A capacitor is included within varactor 200, which includes several parallel sub-capacitors which are distributed between the actuation electrodes as shown in FIG. 3, which is a top view of varactor 200. The sub-capacitors (C1, C2, and C3, in this embodiment) have different sizes. The C1 capacitor has the smallest size, which is located corresponding to the lowest spring constant (k1) of electrode 215. This is because that the smallest capacitor has a smallest self-actuation force and the low k1 constant will be adequate to resist this force created by RF signal.

In a further embodiment, the C3 capacitor is the largest, and is located corresponding to the highest spring constant (k3) of electrode 215 so that the spring force can resist the larger self-actuation force from this large capacitor. Such an arrangement reduces the unwanted self-actuation at the capacitor region induced by RF signal.

Figure 4:
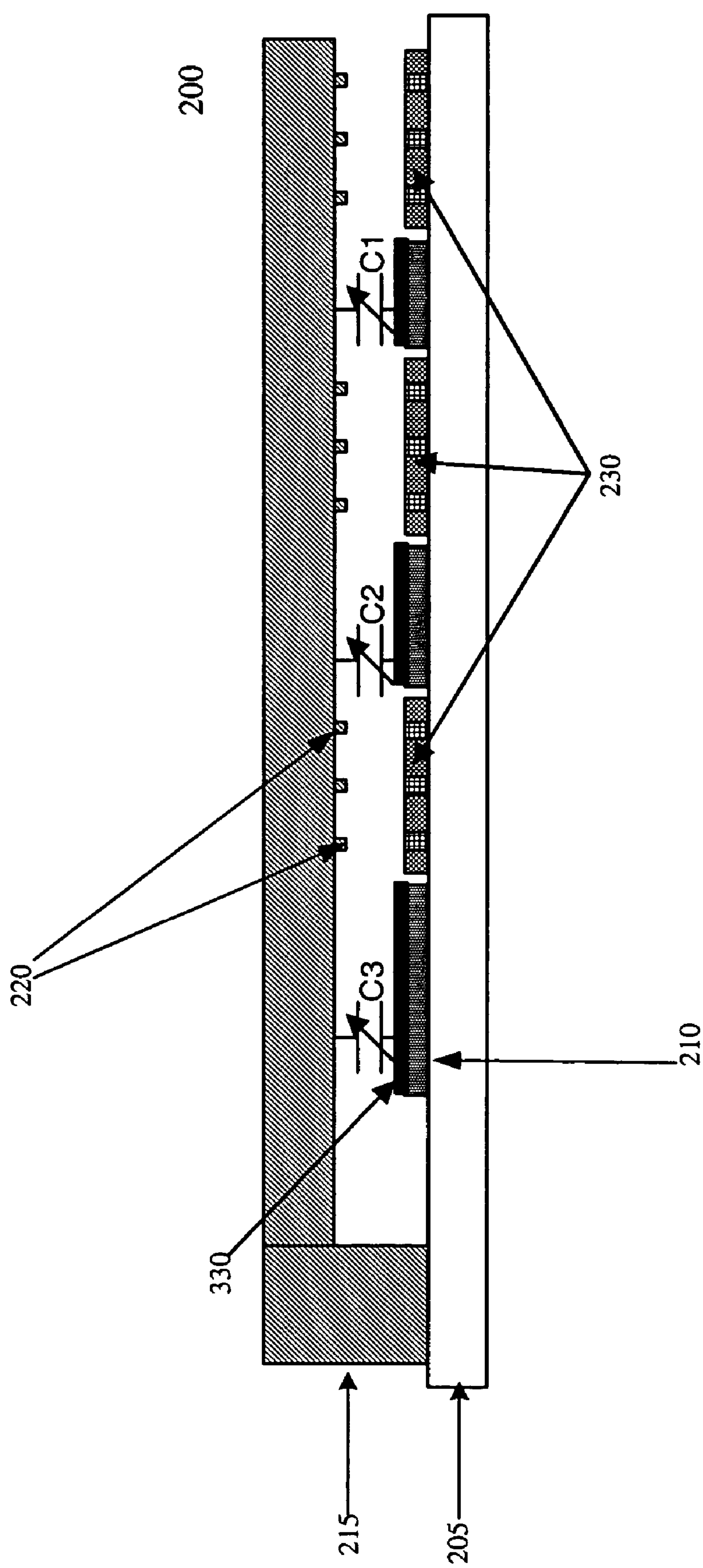
FIG. 4 illustrates a cross section view of another embodiment of a RF MEMS varactor.

FIG. 4 illustrates a cross section view of another embodiment of a RF MEMS varactor 200. In this embodiment, a dielectric layer 330 is deposited on each electrode 210, and is coupled to the capacitor to increase the total capacitance.

Figure 5:
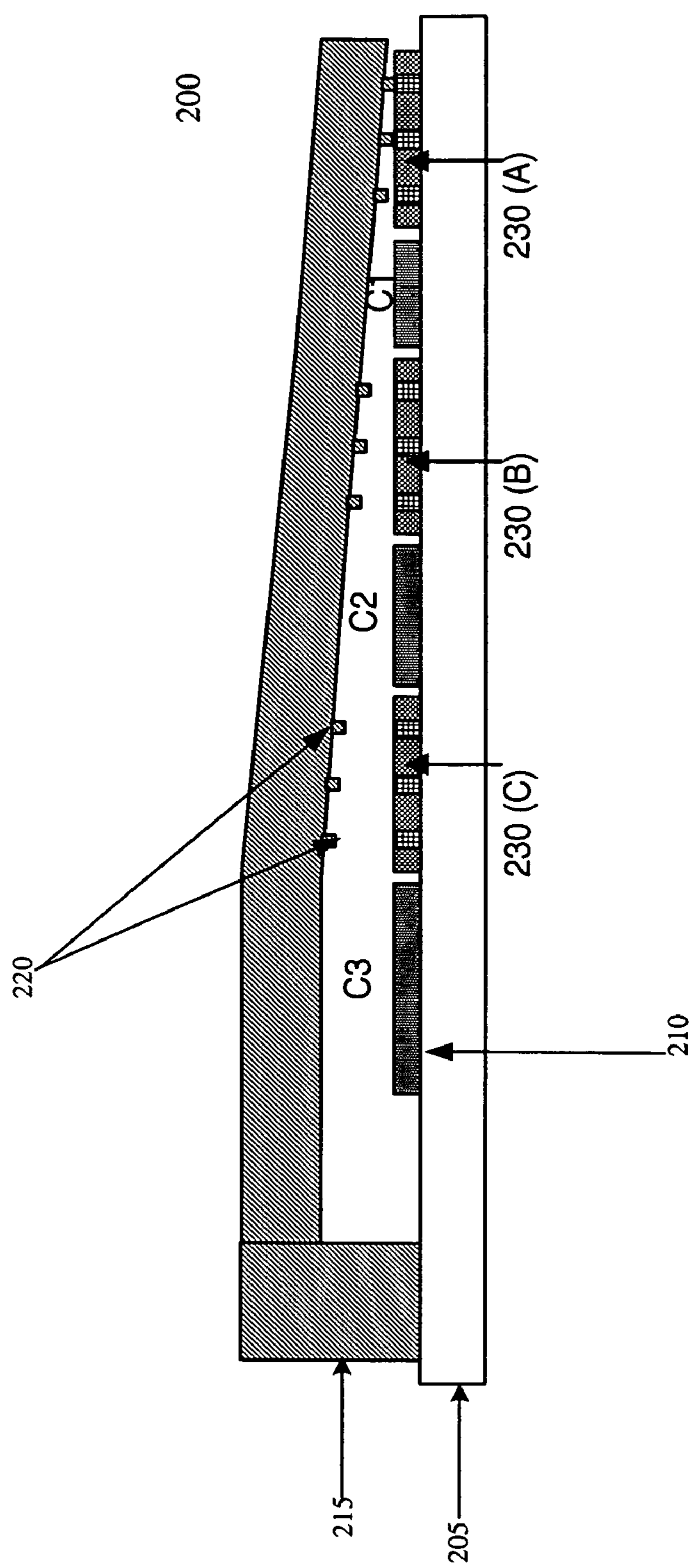
FIG. 5 illustrates a cross section view of yet another embodiment of a RF MEMS varactor.

FIG. 5 illustrates one embodiment of varactor 200 during actuation of the collapsing zipper varactor. As shown in FIG. 5, electrode 215 is actuated with the tip collapsing on the first actuation electrode 230(A). As a result, both C1 and C2 (and slightly on C3) have an increased capacitance due to the reduced air gap with bending of top plate electrode 215.

According to one embodiment, the change of capacitance is continuous if all electrodes 230 are connected (i.e., V1=V2=V3=Va) with a single analog actuation voltage (Va). The embodiment of FIG. 5 may also be achieved by an alternative digital actuation scheme such as V1=Vb, V2=0, V3=0. The V1=Vb causes the beam electrode 215 to collapse at tip of the beam as shown in FIG. 5.

Figure 6:
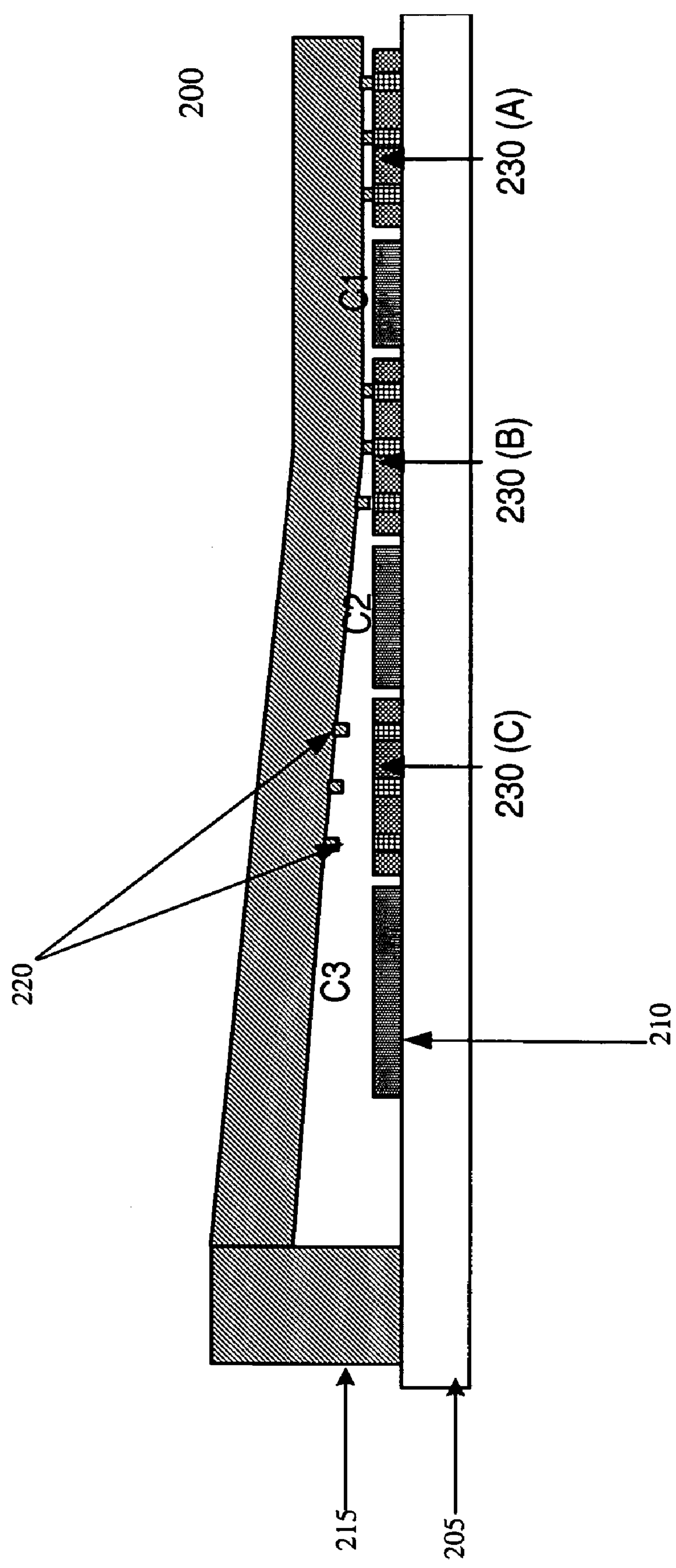
FIG. 6 illustrates a cross section view of still another embodiment of a RF MEMS varactor.

FIG. 6 illustrates another embodiment of varactor 200 during actuation of the collapsing zipper varactor. For the case of all actuation electrodes 230 being connected (e.g., V1=V2=V3=Va), the increase of actuation voltage results in the further collapsing of top beam electrode 215 with an zipping action towards its beam anchor as shown in FIG. 6. The C1 capacitor reaches it maximum and does not contribute to the total increase of capacitance further.

The increase of capacitance continues from the capacitor C2 and C3. Although the beam 215 spring constant increases as the zipping action continues, the total capacitance may still increase linearly since the C2 capacitor is larger in size. The phenomenon shown in FIG. 6 may also be achieved in the digital actuation scheme by addition of voltage to actuation electrode 230(B) from FIG. 5, e.g., V1=V2=Vb, and V3=0. Note that the capacitance of the varactor illustrated is determined by the air gap defined from the physical stopper 220. If the stopper 220 height is reduced, the total capacitance may be increased.

Figure 7:
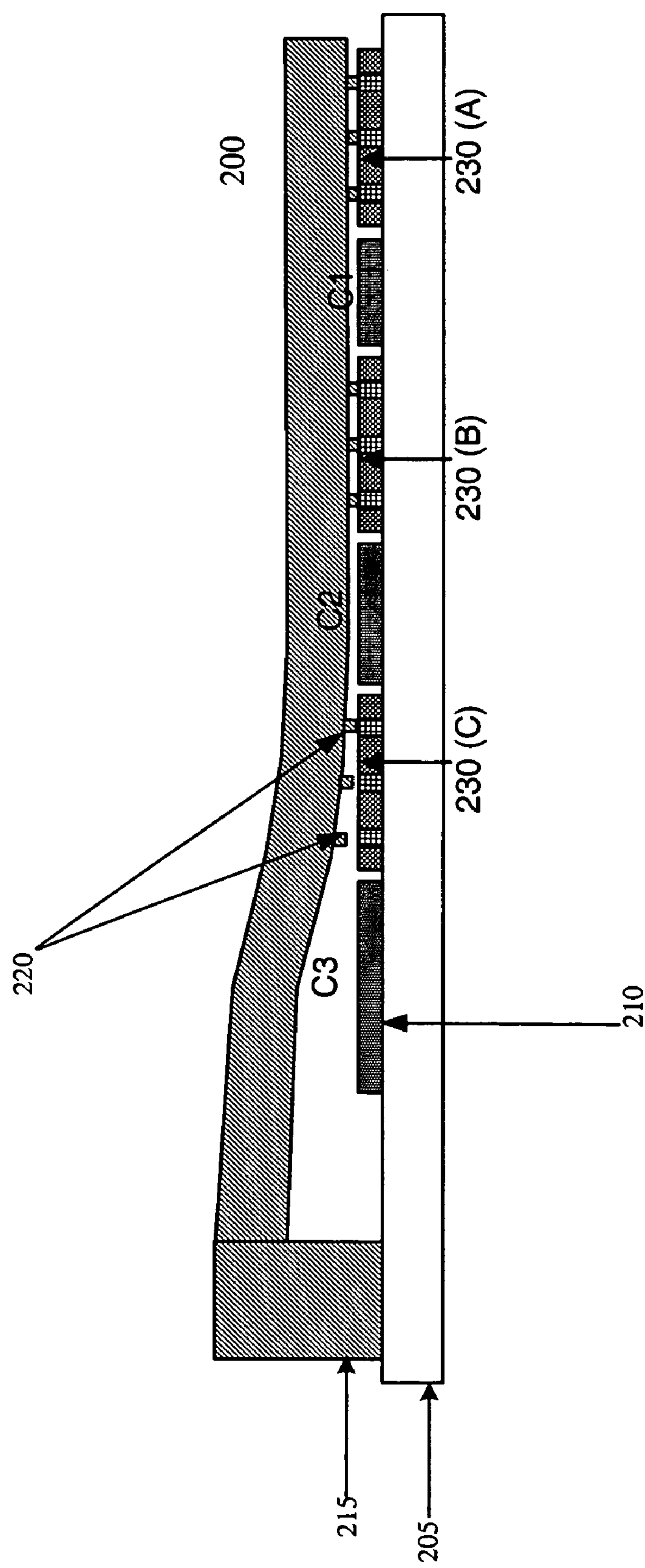
FIG. 7 illustrates a cross section view of another embodiment of a RF MEMS varactor.

FIG. 7 illustrates yet another embodiment of varactor 200 during actuation of the collapsing zipper varactor. For the case of all actuation electrodes 230 being connected (e.g., V1=V2=V3=Va), as the actuation voltage continues to increase, the top beam electrode 215 further collapses and the largest sub-capacitor C3 has the major contribution to the further increase of capacitance as shown in FIG. 7. For the case of the digit actuation scheme, the occurrence shown in FIG. 7 is achieved when all the electrodes are applied with the voltage, e.g., V1=V2=V3=Vb.

Figure 8:
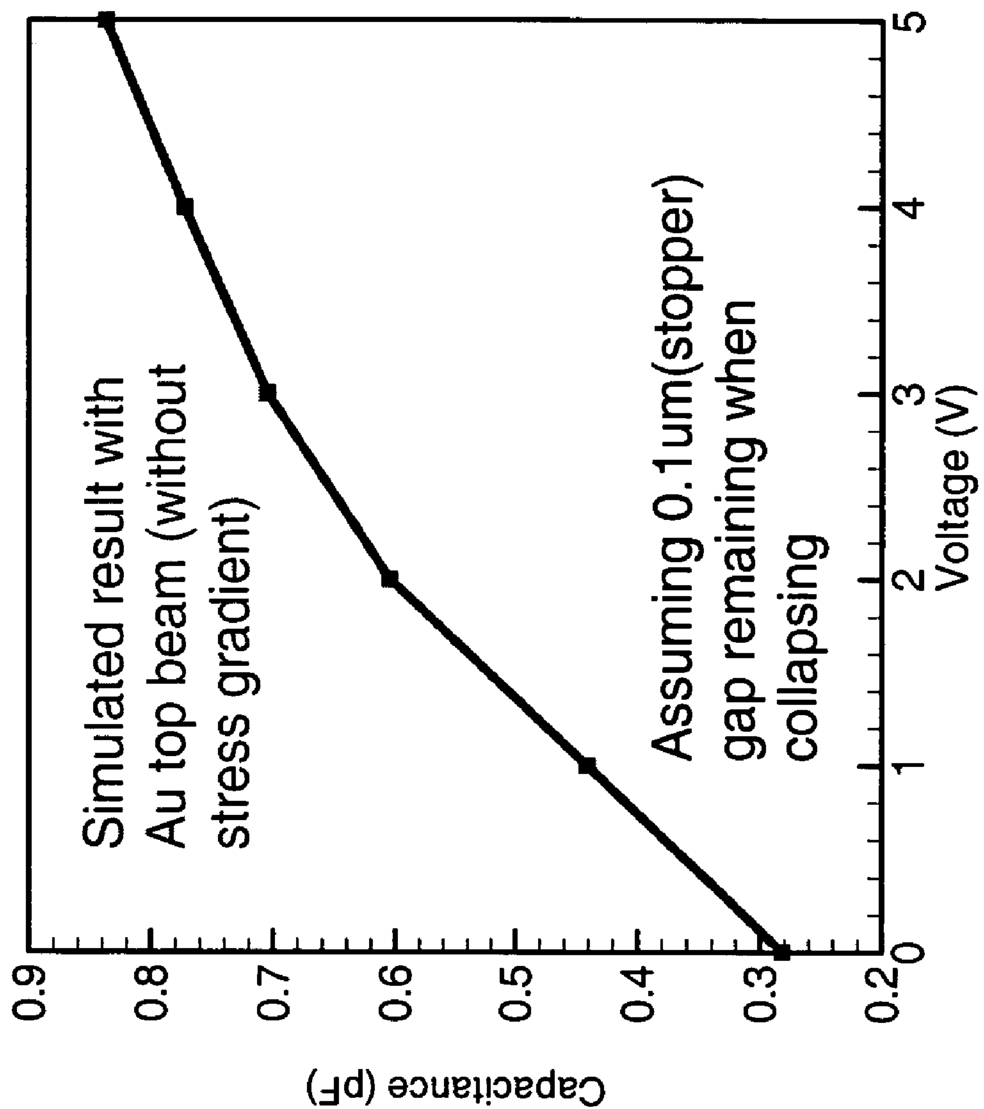
FIG. 8 is a graph illustrating one embodiment of simulation results.

FIG. 8 is a graph illustrating one embodiment of simulation results for the collapsing zipper varactor. As shown in FIG. 8, the capacitance ranges from approximately 0.28 pF to approximately 0.84 pF. The tuning ratio is approximately 3, which is much larger than the traditional single gap varactor with similar fabrication simplicity. Note that a stopper 220 height of 0.1 um was used in the simulation. With the reduction of stopper 220 height, the total capacitance can be more than 1 pF. Although not optimized, the simulation result also shows the high linearity of capacitance vs. applied voltage.

Figure 9A:
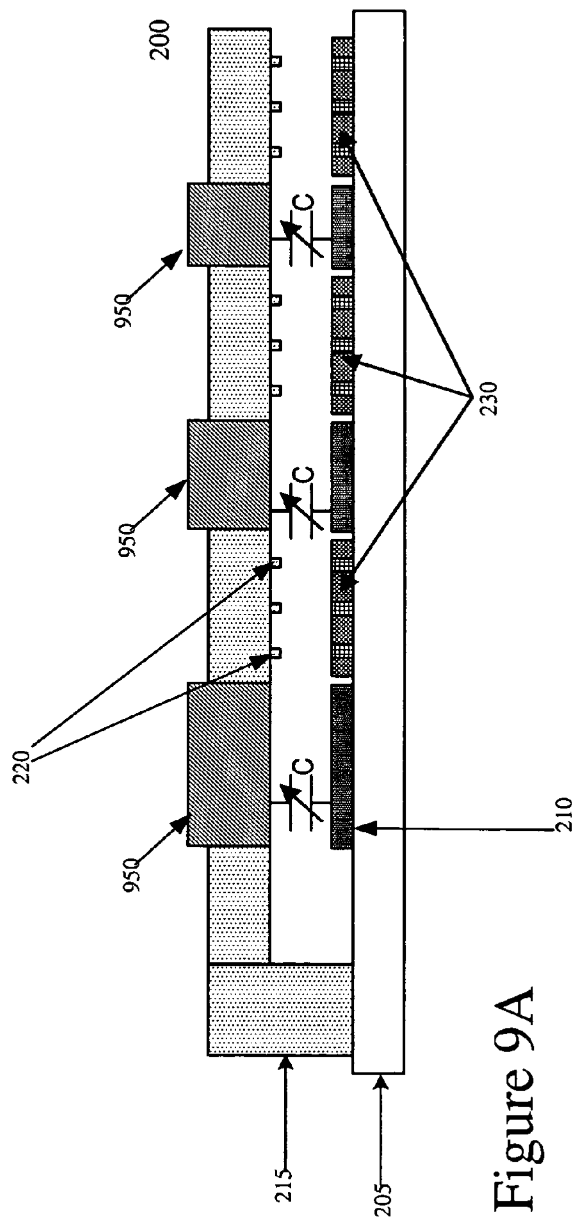
FIG. 9A illustrates a cross section view of another embodiment of a RF MEMS varactor.

FIG. 9A illustrates a cross section view of another embodiment of a RF MEMS varactor 200 where top beam electrode 215 is made up of a low stress gradient polysilicon in order to achieve the ultra-low-voltage actuation (<3V). In such an embodiment, the main actuation component of top beam 215 is composed of low stress gradient polysilicon for low voltage actuation.

Figure 9B:
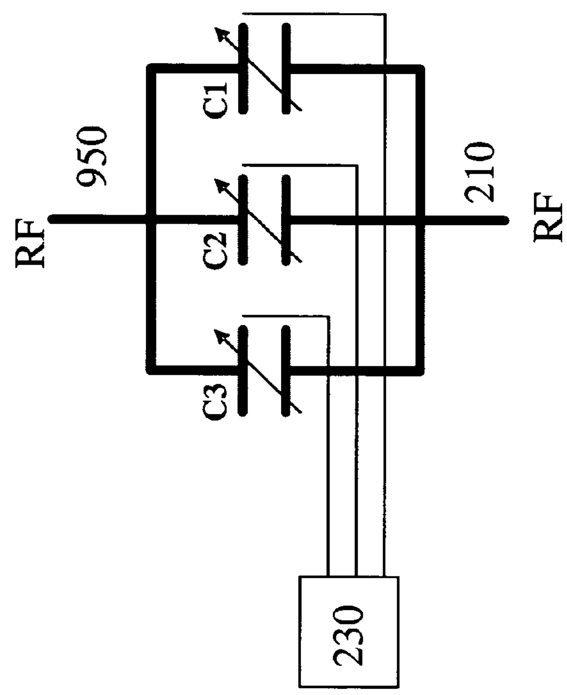
FIG. 9B illustrates a schematic of another embodiment of a RF MEMS varactor.
Figure 10:
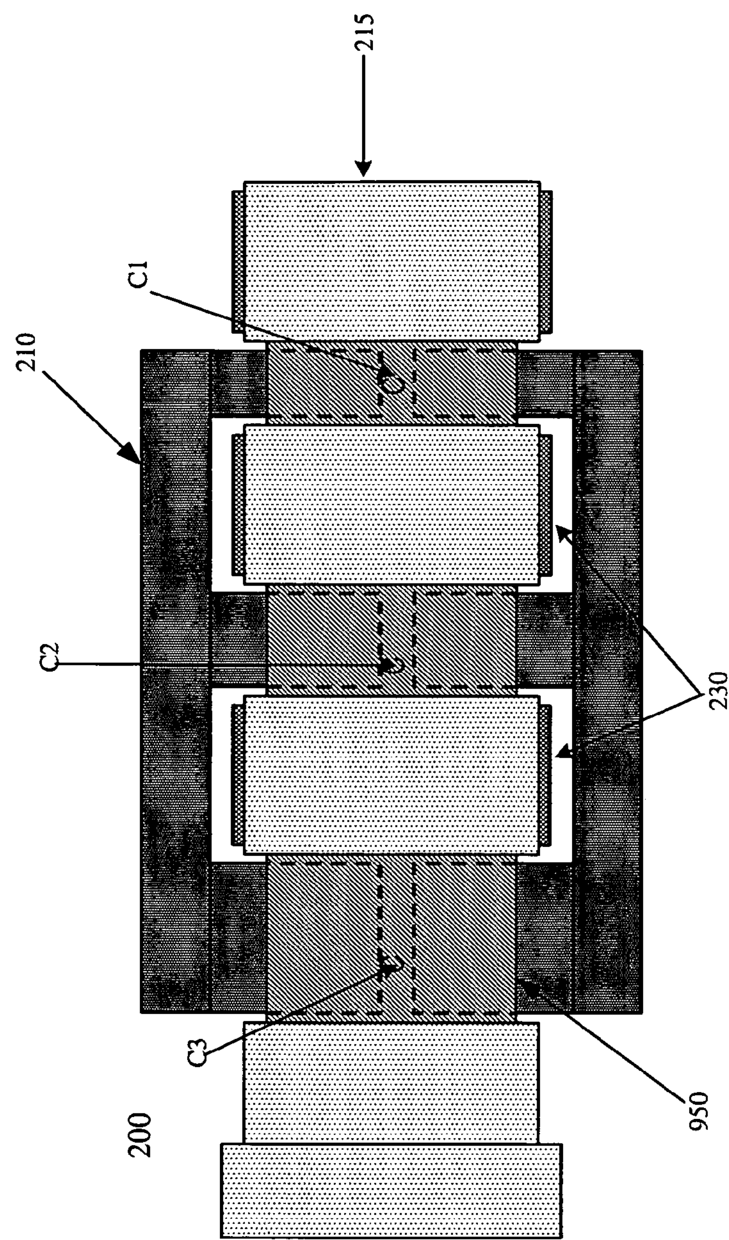
FIG. 10 illustrates a top view of one embodiment of a RF MEMS varactor.

Further, the portion of electrode 215 not above actuation electrodes 230 is composed of metal 950 (e.g. for low resistivity) and is still used in order to have a high quality factor of capacitance. Note that electrode 215 (polysilicon) in such case is no longer used as part of RF signal path. Electrode 215 is the carrier structure and actuation electrode for varactor 200. The actuation mechanism is same as the metal beam switch described previously. FIG. 9B illustrates one embodiment of a schematic for the varactor 200 shown in FIG. 9A, and FIG. 10 illustrates a top view of a varactor 150 with a top beam electrode 215 made up of polysilicon.

Figure 11:
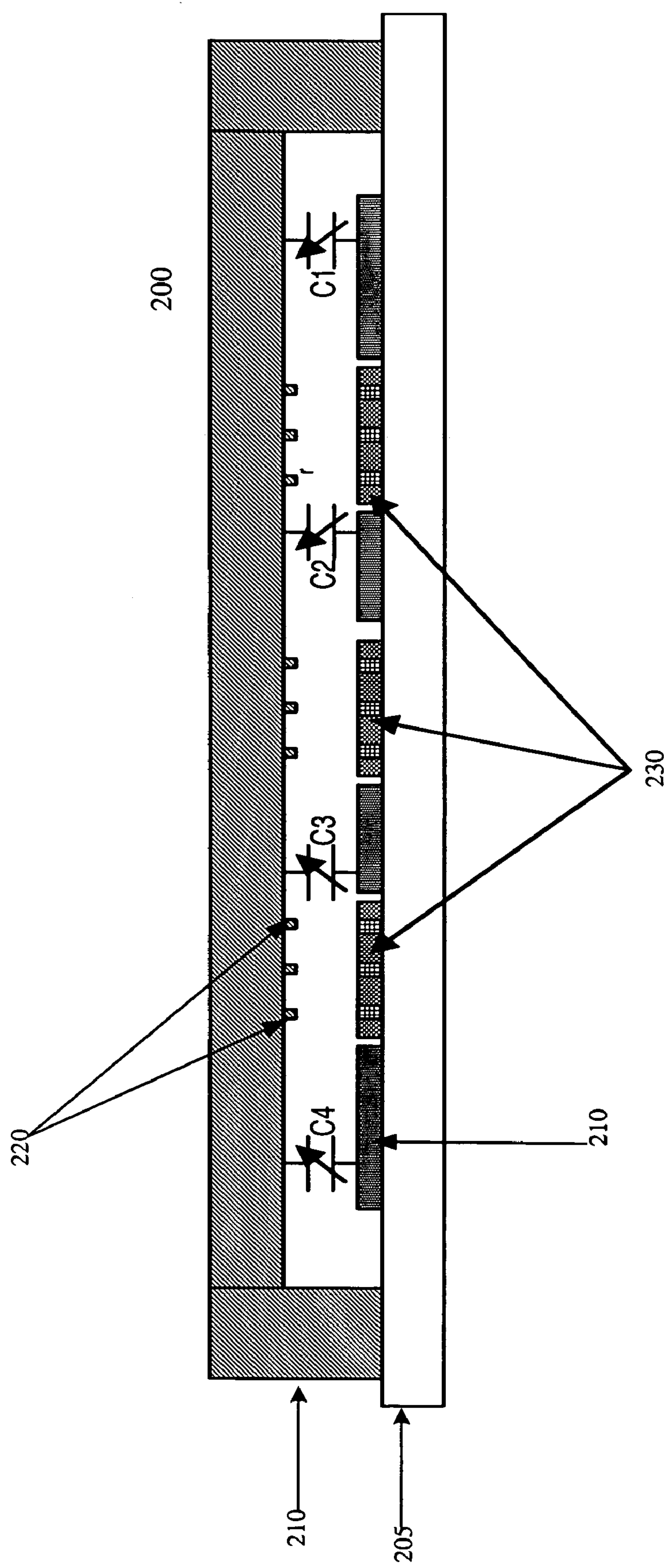
FIG. 11 illustrates a cross section view of another embodiment of a RF MEMS varactor.

FIG. 11 illustrates a cross section view of yet another embodiment of a RF MEMS varactor 200. In this embodiment, a clamp-clamp beam type collapsing zipper varactor is implemented, where the top electrode 215 is anchored on both sides. In such an embodiment, the collapsing zipping action occurs from center of the top beam in contrast to the cantilever type varactor shown above with respect to the embodiments described above, where zipping action occurs from the edge of top beam 215.

Figure 12:
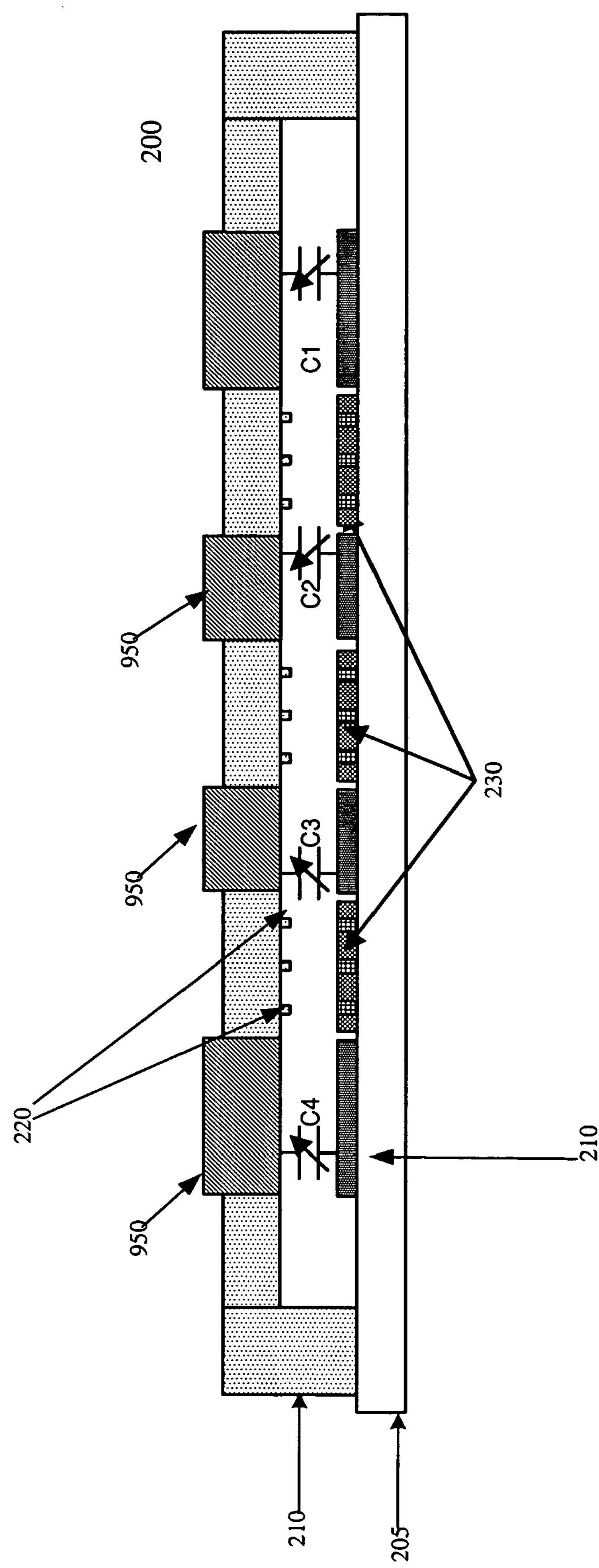
FIG. 12 illustrates a cross section view of yet another embodiment of a RF MEMS varactor.

FIG. 12 illustrates a cross section view of yet another embodiment of a RF MEMS varactor 200 where a clamp-clamp beam type collapsing zipper varactor is implemented with the polysilicon top beam electrode 215 described above in FIGS. 9A, 9B and 10.

The above described the varactor implements a parallel capacitor with a top bendable plate and inter-digit actuation electrodes to achieve high tuning ratio. The top movable/bendable plate is actuated by the actuation electrodes and collapses towards the bottom electrodes with zipping action. The amount of capacitance change can be achieved by either changing the voltage on all the actuation electrodes simultaneously or apply the fixed voltage on separate (inter-digit) actuation electrodes digitally.

With the collapsing zipping action, the capacitance tuning may be increased continuously along with an increase of collapsing area. With the inter-digit actuation electrode configuration, each electrode can be individually size-optimized to reduce the required actuation voltage. Moreover, the capacitor is also divided into several plates with various sizes depending on the location on the top plate. The size of the separate capacitors can be optimized to increase the capacitance linearity and reduce the self-actuation due to RF signal across the capacitor.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A microelectromechanical (MEMS) varactor comprising:

a substrate;

a plurality of actuation electrodes mounted on the substrate;

a plurality of bottom electrodes mounted on the substrate;

a capacitor having subcomponents mounted on the two or more bottom electrodes; and a top bendable electrode mounted on the substrate to collapse a first magnitude towards the actuation electrodes whenever a first voltage is applied to one or more of the actuation electrodes and to collapse a second magnitude towards the actuation electrodes whenever a second voltage is applied to the actuation electrodes.

2. The varactor of claim 1 further comprising a dielectric layer deposited on the plurality of capacitor bottom electrodes to increase the capacitance of the capacitor.

3. The varactor of claim 2 further comprising stoppers mounted on the top plate to maintain a predetermined gap between the top electrode and the actuation electrodes.

4. The varactor of claim 1 wherein the top electrode is actuated at a first actuation electrode and not actuated at a second actuated electrode whenever the first voltage is applied.

5. The varactor of claim 4 wherein the top electrode is actuated at the first actuation electrode and the second actuated electrode whenever the second voltage is applied.

6. The varactor of claim 1 wherein the actuation electrodes are inter-digit actuation electrodes.

7. The varactor of claim 6 wherein voltage is applied simultaneously to each digit of the actuation electrodes.

8. The varactor of claim 6 wherein voltage is applied separately to each digit of the actuation electrodes.

9. The varactor of claim 1 wherein the top beam is comprised metal.

10. The varactor of claim 1 wherein the top beam is comprised of polysilicon and metal.

11. The varactor of claim 1 wherein the top beam is a clamp-clamp beam.

12. The varactor of claim 1 wherein each sub-component of the capacitor comprises a different capacitance value.

* * * * *